United States Patent [19]

Stoltz et al.

[11] Patent Number: 4,642,833

[45] Date of Patent: Feb. 17, 1987

[54] VALVE ASSEMBLY

[75] Inventors: Andries J. Stoltz, Pretoria; Dieter H. F. Kallenbach, Sandton, both of South Africa

[73] Assignee: Coxwold (Proprietary) Limited, Johannesburg, South Africa

[21] Appl. No.: 749,793

[22] Filed: Jun. 28, 1985

Related U.S. Application Data

[63] Continuation-in-part of Ser. No. 687,568, Dec. 28, 1984.

[30] Foreign Application Priority Data

Mar. 14, 1985 [ZA] South Africa ................ 85/1914

[51] Int. Cl.[4] .................................... E04H 3/20
[52] U.S. Cl. .............................. 15/1.7; 137/624.14; 137/853; 239/101; 251/5
[58] Field of Search .................. 239/101; 251/5; 137/624.14, 853; 15/1.7

[56] References Cited

U.S. PATENT DOCUMENTS

| | | | |
|---|---|---|---|
| 3,469,582 | 9/1969 | Jackson | 604/119 |
| 3,759,289 | 9/1973 | De Wall | 137/525 |
| 3,803,658 | 4/1974 | Raubenheimer | 15/1.7 |
| 3,883,074 | 5/1975 | Lambert | 239/101 |
| 4,195,810 | 4/1980 | Lavin | 251/5 |
| 4,512,514 | 4/1985 | Elcott | 239/99 |

FOREIGN PATENT DOCUMENTS

45292 2/1982 European Pat. Off. ............ 239/101

Primary Examiner—Samuel Scott
Assistant Examiner—Allen J. Flanigan
Attorney, Agent, or Firm—Arnold, White & Durkee

[57] ABSTRACT

This invention relates to a valve assembly including a hollow body housing a tubular flexible diaphragm therein to provide a passage for fluid flow through the body. The assembly includes means whereby pressures within the diaphragm and in the chamber between the diaphragm and the hollow body are controlled so that, in use with fluid flowing through the diaphragm, it will be caused to automatically and repeatedly contract and expand. This will result in a pulsating flow of fluid through the assembly. Such a valve assembly finds particular application in a swimming pool cleaner operating off the reduced pressure provided by the pump for the conventional pool filtration plant and this invention includes a cleaner of this type including a valve assembly as set forth.

28 Claims, 13 Drawing Figures

VALVE ASSEMBLY

This application is a continuation in part of Ser. No. 06/687,568, filed 12/28/84.

BACKGROUND TO THE INVENTION

This invention relates to a valve assembly. In particular, it relates to a valve for controlling the intermittent flow of a fluid through a passage. The invention also relates to means for cleaning a surface submerged in a liquid, such as a swimming pool cleaning device, utilizing the valve.

There are different types of pool cleaners known which operate on different principles to give the cleaner automatic movement over the surface to be cleaned. This invention is concerned with the type of cleaner which operates on the reduced pressure caused by a pump used to induce flow of water from a swimming pool through the conventional filtration equipment and thence back to the pool. The principle of operation is effected by intermittently interrupting the flow through the cleaner to the pump and use a special valve assembly for effecting this cycle interruption. The principle has been effected through oscillatory movement of a valve to interrupt flow through a cleaner and in an alternative arrangement by the use of a valve carried in rotational movement by a wheel which is driven by flow of liquid through the cleaner.

SUMMARY OF THE INVENTION

According to the invention there is provided a valve assembly comprising a body having a fluid inlet and a fluid outlet, a flow passage between the inlet and the outlet at least partly defined by a tubular member which is transversely contractable and expansible over at least part of its length to control the flow of fluid through the passage, the body forming a chamber around the tube and means, reponsive to variation in pressure internally and externally of the tubular member, for controlling the flow of fluid through the flow passage.

Further features of the invention provide for the part of the tubular member which is contractable and expansible to be circumferentially collapsible and expansible and to be of an elastic material, such as rubber or a synthetic plastics material. Alternatively, it may be of a flexible material or contain a flexible insert which is capable of being moved between a contracted position and an expanded position.

The invention also provides for the assembly to be such that the tubular member is completely closed to fluid flow when in the contracted condition or contracted only to a degree which will enable substantial interruption of the flow through the passages to be effected.

The chamber may be sealed or it may have a fluid path externally of the tubular member to the fluid outlet. The fluid path in the latter instance may include an inlet into the chamber from the outside with inlet for alternately opening and closing this inlet responsive to the contraction or expansion of the tubular member.

Where the tubular member is made from elastic material it may be made to have a downstream portion less elastic than the remainder and the length of the less elastic part of the tubular member may vary circumferentially adjacent the more elastic portion and the tubular member may be reinforced with fabric or other stranded material.

The body may also be of elastic material or have a portion of its outer wall of elastic material but of appreciably less elasticity than the tubular member.

BRIEF DESCRIPTION OF THE DRAWINGS

Preferred embodiments of the invention will be described with reference to the accompanying drawings in which.

DETAILED DESCRIPTION OF THE DRAWINGS

Figure 1:
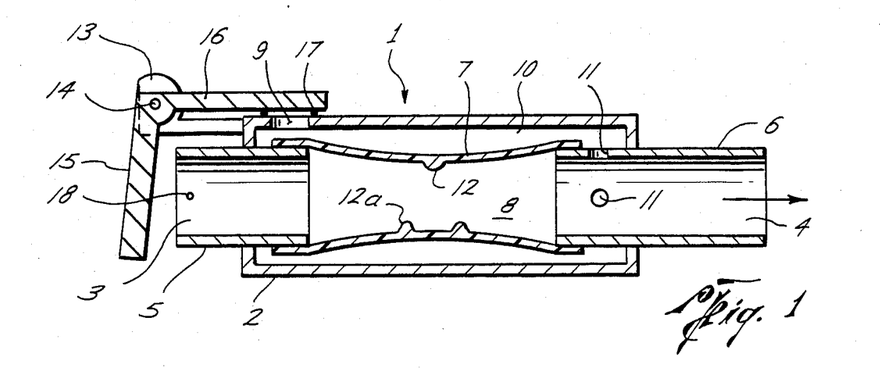
FIGS. 1 to 6 illustrates axial sectional views of different embodiments.

As shown in FIG. 1, reference numeral 1 generally indicates a valve assembly comprising a body 2 having a fluid inlet 3 and a fluid outlet 4. The inlet 3 is formed by a rigid tube 5 and the outlet 4 by a rigid tube 6. A tubular member or diaphragm 7 of elastomeric material extends between the tubes 5 and 6, defining a flow passage 8.

The body 2 is further provided with a secondary inlet 9 into the substantially annular chamber 10 which is defined in the body 2, externally of and around the tubular member 7. Openings or ports 11 are provided in the tube 6 downstream of the tubular member 7 which connect the chamber 10 with a flow passage 8 to permit automatic regulation of the pressure in the flow passage 8 and the chamber 10.

The diaphragm 7 is provided with inner circumferential ribs 12 and 12a extending along substantially 180° of the surface of the diaphragm 7 and on opposite sides thereof, as shown. The ribs 12 and 12a assist in closing the diaphragm 7 to the flow of fluid, as will be described in more detail below.

A substantially L-shaped control member 13 is mounted for pivotal movement about an axis 14 and has a pair of control flaps 15 and 16 arranged for co-operating with the inlets 3 and 9, respectively. An annular seal 17 is provided around the inlet 9 to assist in sealing off the inlet 9 by means of the flap 16, as will be described in greater detail below.

The flaps 15 and 16 are arranged at an angle with respect to each other which is somewhat greater than 90° but also preferably not greater than 100°.

A bleed opening 18 is provided into the tube 5 to allow leakage of fluid into the inlet 8 when this inlet is closed by means of the flap 15, the purpose of which will be described below.

The valve assembly 1 operates as set out below and is described in a situation when the valve assembly 15 is submerged in a fluid similar to that which is to flow intermittantly through the passage 8.

In use, the inlets 3 and 9 are both in communication with the fluid. The outlet 4 is in communication with a region of reduced pressure or means for creating a reduced pressure, such as a suction pump (not shown).

When the pump is operated a reduced pressure is applied to the outlet 4, with the control member 13 in the position as shown in FIG. 1, the diaphragm 7 will remain in the open condition, due to substantially equal fluid pressure being exerted on both the inner and outer surfaces of the diaphragm 7. The tendency of the diaphragm 7 is to retain its normal open shape due to the pressures within and outside it and its inherent physical characteristics. The latter is predetermined by the choice of elastomeric material to suit the particular application to which the valve assembly is to be put. The equalization of pressure is achieved by means of the openings 11 in the tube 4 connecting the chamber 10 with the flow passage 8.

Fluid therefore flows freely through the flow passage 8. However, this flow of fluid will sweep the flap 15 against the tube 5 causing it to close the inlet 3. Closing of the inlet 3 will cause the flap 16 to open the inlet 9 by virtue of the pivotal movement of the member 13 about the axis 14. This will in turn result in a flow of fluid into the chamber 10 and exiting through the ports 11. This creates a force contracting the diaphragm 7 due to unequal pressure on the inside and the outside of the diaphragm. The diaphragm 7 will therefore contract, closing off the flow of fluid therethrough. This action is assisted by the ribs 12 and 12a. This results in the release of the flap 15 to again open the inlet 3 to the flow of fluid. This is assisted by the bleed opening 18. The control member 13 may in addition be spring-loaded, to the position shown in FIG. 1, to facilitate opening of the inlet 3. Opening of the inlet 3, closes the inlet 9 and the process is repeated so that the control member 13 continuously performs an oscillating movement about the axis to alternately open and close inlets 3 and 9.

The diaphragm 7 may have any suitable shape in cross-section and the ribs 12 and 12a may be such that either total or partial interruption of fluid flow through the diaphragm 7 is achieved. The diaphragm 7 as shown may be cylindrical in cross-section but it has been found that a substantially oval-shaped or diamond-shaped cross-section can be advantageous when a total fluid flow interruption is to be achieved.

In place of the control member 13, other means may be used to achieve either a synchronous or independant opening and closing off the inlets 3 and 9.

Figure 2:
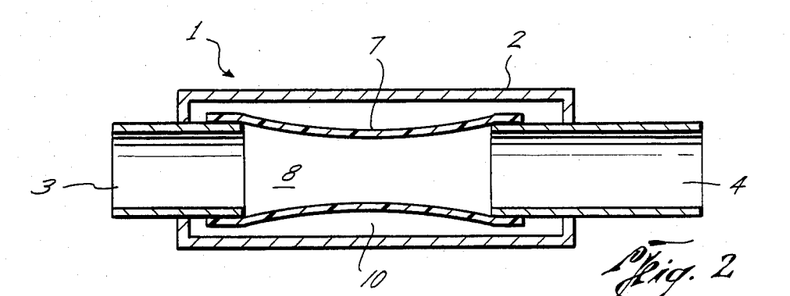

As shown in FIG. 2, the chamber 10 is completely sealed and an elastic at a predetermined pressure fluid is contained between the diaphragm 7 and the outer body 2. Thus fluid tends to compress the diaphragm as fluid flowing through the passage 8 results in a reduced pressure therein. This flow through the passage results in a contraction of the diaphragm 7 and this allows the fluid in the body to expand consequently reducing its pressure to a point where the diaphragm 7 reacts to expand again. Fluid may then again flow through the passage 8.

The mechanism enables a pulsating flow of a liquid through the passage 8 to be obtained by the alternating contracting and expansion of the diaphragm. The material of the diaphragm and choice of the compressible fluid and its pressure will enable a stable rhythmic operation of the valve assembly to be obtained.

Figure 3:
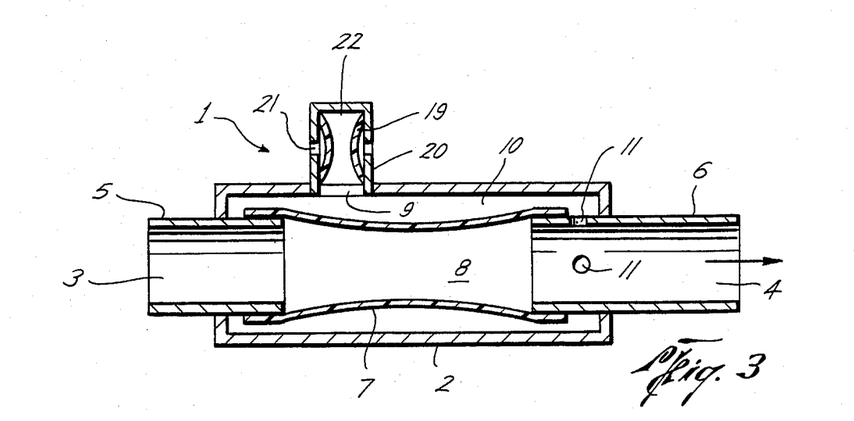

Referring now to FIG. 3, a valve assembly 1 according to another embodiment of the invention is shown. The assembly 1 is basically similar to the other embodiments described above and like parts are correspondingly referenced.

The main difference between the embodiments of FIGS. 1 and 3 is that, instead of the control member 13, the assembly has a secondary tubular diaphragm 19, situated in a tube 20 at the inlet 9. The tube 20 is provided with ports 21 for equalizing the pressure on the inside and the outside of the diaphragm 19.

In use, under the same conditions as in FIG. 1, fluid can flow through the diaphragm 19, as shown at 22 in FIG. 3, as well as along the flow passage 8 through the diaphragm 7. During such flow, the diaphragm 7 is adapted to close first, due to its larger surface area and other design features, including shape and material of the diaphragms. Closing of the passage 8 will result in an increased flow through the diaphragm 19, resulting in contraction and closure thereof. This will cause the diaphragm 7 to open again due to the reduction of pressure in the chamber 10. When the flow through the diaphragm 7 is resumed, the diaphragm 19 will open because the flow rate therethrough is reduced and pressure increased so that it cannot maintain its closed position. This will result in the diaphragm contracting again and the cycle is repeated automatically. This causes a substantially pulsating fluid flow through the passage 8.

Figure 4:
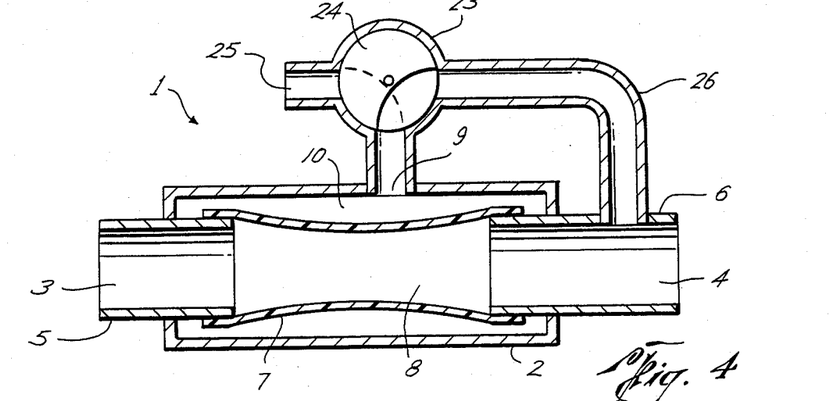

Referring now to FIG. 4, a valve assembly 1 according to a further embodiment of the invention is shown. The valve assembly 1 is again basically similar to that shown in FIG. 1, except for the mechanism used for opening and closing the inlet 9. In this embodiment the valve assembly 1 is provided with a secondary valve 23 having an oscillatable flow direction control component 24 which is adapted alternately to direct fluid flow through an inlet opening 25 and an outlet tube 26, which is in communication with the outlet of passage 8. (The first mentioned position is shown by dotted lines in FIG. 4.)

The operation of the diaphragm 7 is the same as that described above. The oscillatable component 24 is biased, (conveniently by a suitable spring not shown) to the position where inlet opening 25 is open. When the diaphragm 7 contracts to close passage 8 the resulting reduced pressure in outlet tube 26 causes the component 24 of valve 23 to swing to open the outlet 26 to the chamber 10. This results in a reduction of pressure thereon and the diaphragm 7 reopens. This in turn results in a relative increase in pressure in outlet tube 26 enabling component 24 to revert to its original position described.

The effect of the valve is to obtain a rhythmic pulsation of fluid flow through the passage 8.

Figure 5:
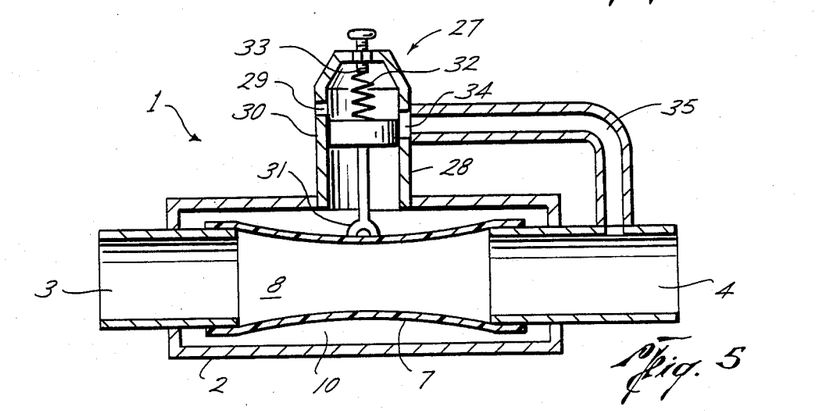

An alternative form of secondary valve is shown in FIG. 5. In this form the secondary valve 27 is in the form of a cylinder 28 in communication with ambient fluid relief opening 29 and with the chamber 10. A piston 30 operable in cylinder 28 with variation in pressure applied thereto is connected to the diaphragm 7 by link illustrated at 31.

The piston 30 also has a biasing spring 32 connected to it which spring 32 is adhered to the end of the cylinder 28 through a means shown at 33 for varying the tension in the spring 32.

An outlet 34 from cylinder 28 leads through tube 35 to the outlet 4 of the valve assembly 1. The outlet 34 is located to be closed and opened by movement of the piston 30 in the cylinder 28.

In use contracting of the diaphragm 8 in the manner described above draws the piston 30 along the cylinder 28 to open outlets 34. This results in the reduced pressure in outlet 4 being transferred to the pistion 30 and together with the effect of the spring draws the piston in the cylinder to reclose the outlet 34 while simultaneously assisting in reopening the diaphragm 7.

This assembly also provides control to result in rhythmic pulsation of fluid flow through passage 8.

Figure 6:
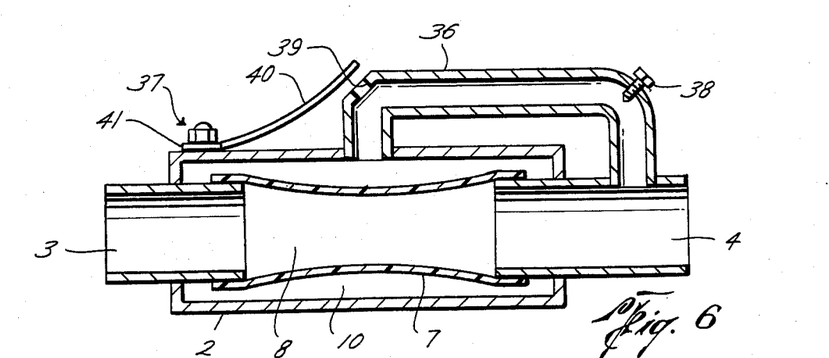

FIG. 6 illustrates a still further alternative to the device shown in FIGS'S 1 to 5. In this embodiment the chamber 10 is connected to the outlet 9 through tube 36. The tube 36 may be open to conduct fluid through a valve 37 or may have a variable constriction in the length thereof provided by an adjustable screw 38 passing through the wall of the tube 36. This enables the effective cross-section of the tube 36 to be varied at this point by inserting or withdrawing the screw 38 into or from the tube 36.

The valve 37 serves to control an opening 39 into the tube 36. There is a flexible member 40 which is drawn by reduced pressure in tube 36 to close the opening 39 and the inherent resistance to the flexing of member 40 to close opening 39 can be made variable. In a simple form this can be effected by the construction of member 40. By anchoring it, through a releasable lock indicated at 41 at different positions along its length, the opening 39 may be closed due to different selected pressure reductions within tube 36.

Thus in use when diaphragm 7 closes the reduction of pressure in chamber 10 due to flow induced through tube 39 will cause the valve member 40 to close thus varying the effect of the reduced pressure in the outlet 4 on the diaphragm 7.

Both control means illustrated in FIG. 6 enable the operation of the valve assembly 1 to be controlled to suit particular operating conditions for the assembly 1.

Figure 7:
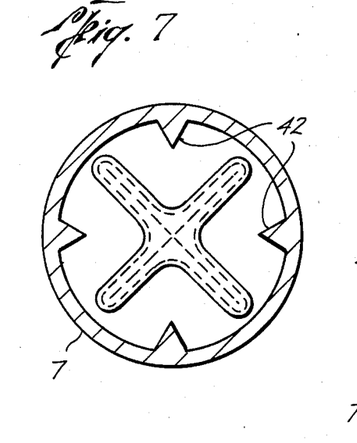
FIGS. 7 and 8 illustrates details of specific forms of tubular members.

FIG. 7 shows in cross-section a diaphragm 7 where the circumferential ribs 12 and 12a have been replaced by longitudinal ribs 42. These ribs need not extend down the full length of the diaphragm 7 but only along that part which contracts to the greatest extent. The ribs enable the diaphragm 7 to contract to the particular pattern indicated by dotted lines in FIG. 7.

Figure 8:
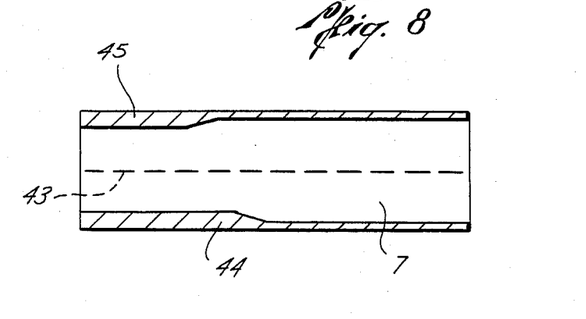

FIG. 8 illustrates a further variation of the diaphragm 7 which is made to an oval configuration. The stiffness of the diaphragm 7 at the outlet end is made, by varying the thickness of the material in the wall of the diaphragm near this end, different along the length of the diaphragm. With such a construction there will also be lines 43 of least stiffness down the length of the diaphragm so that it can collapse to a flattened condition and open into an oval cross-section. The thickened parts of the diaphragm need not be co-extensive along the length of the diaphragm. One side 44 may be thickened for a greater length than the opposite side 45.

From the above it will be appreciated that the diaphragm 7 can be made to many varied configurations to allow it to work under different circumstances and constructions of valve assembly 1.

Figure 9:
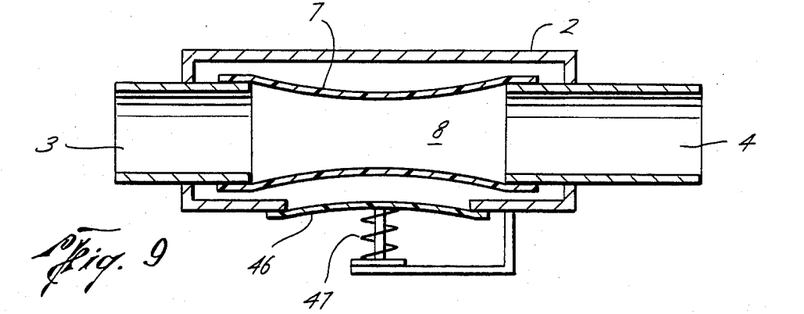
FIG. 9 illustrates the valve assembly wherein the body has a wall with a resilient panel therein.

FIG. 9 illustrates two variations of the valve assembly 1 wherein an incompressible fluid under predetermined pressure fills the chamber 10. In the first variation the body 2 is constructed to have a predetermined resilience such that it can follow the collapse of the diaphragm 7 to maintain the same volume in chamber 10 as when the diaphragm 7 is in its expanded condition. However, the stiffness of the material of the body will be such that once the contracted condition of the diaphragm 7 is reached the stiffness of the body will act to re-expand the diaphragm to open passage 8.

Also illustrated in FIG. 9 is a solid outer body 2 with a flexible panel 46 in the wall thereof. This panel 46 may be of resilient material and acts as the resilient wall of the body 2 described above. However, also illustrated is a tension spring assembly 47 mounted to the body 2 and connected to the panel 46. This assembly 47 provides the necessary force to pull the panel into position to enable the diaphragm to expand after having reached its collapsed condition.

The valve assembly described above finds particular application in an automatic swimming pool cleaner for cleaning submerged walls and floor of a pool. The cleaner is of the type wherein an interruption of the flow of water through the cleaner is utilised to provide a propulsive force to cause the cleaner to move automatically across the surface to be cleaned. The cleaner is located on a submerged surface and connected through a flexible hose to the pump inlet through the swimming pool skimmer unit or through a separate suction line to the pump. The interruption of the flow generates a force which, together with the flexible hose and configuration of cleaner, results in a stepwise movement of the cleaner over the surface to be cleaned.

Figure 10:
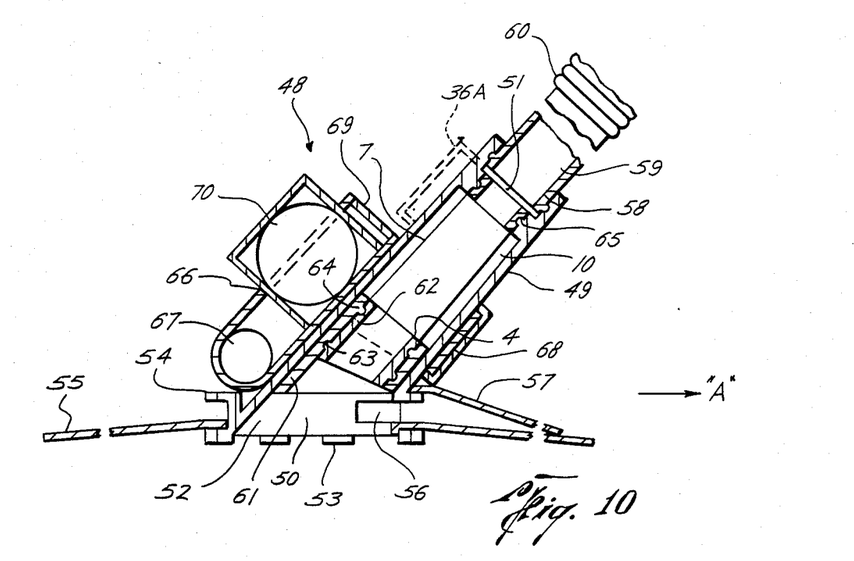
FIG. 10 illustrates the valve assembly included in an automatic pool cleaner.

Such a cleaner is illustrated somewhat diagrammatically in FIG. 10. This figure is representative of the type of pool cleaner described in U.S. Pat. No. 4,208,752 and the disclosure of that specification is incorporated herein.

The cleaner is externally the same as that set out in U.S. Pat. No. 4,208,752 but the means for interrupting the flow is substituted by a valve assembly in accordance with this invention.

The cleaner 48 has an operating head 49 which has a basically rectangular cross-section which extends from an inlet opening 50 to an outlet opening 51. These openings are circular in shape with the axis of the inlet offset from that of the outlet at an angle which is preferably forty-five degrees.

The inlet 50 is made with a foot for the cleaner which will contact the surface to be cleaned. The lower part 52 of the foot has a stepped face 53 so that there are spaced apertures between the surface to be cleaned and the face 53 through which water and dirt may pass when the machine is in operation. Spaced above the lower part of the foot 52 is a peripheral flange 54 and the wall between the flange 54 and part 52 is of reduced diameter around which is fitted a flexible annular flexible disc 55 to be rotatable thereon An opening 56 is provided through the wall between the flange 54 and the part 52 through which water and dirt may pass and a flexible apron 57 is secured around the head to extend over the disc 55 in what is the normal forward direction of the cleaner indicated by arrow "A".

A swivellable fitting 58 is provided at the outlet opening 51 for a rigid extension pipe 59 about the same length as the head 49 and to which a flexible suction hose 60 is attached for connection to the inlet to the pump of conventional swimming pool filtration plant (not shown).

Releasably sealed into the head 49 is a valve assembly 1 of one of the types described above. For simplicity the diaphragm 7 is illustrated as a simple circular cylindrical shape of constant wall thickness.

A hollow plug 61 is fitted into the body adjacent the inlet opening 50. A peripheral formation 62 projecting outwardly around the inlet tube 4 of diaphragm 7 can be made to clip and seal into a complementary recess 63 in the inner wall of the plug 61. This latter assembly will preferably be made a firm press fit and a retaining ring 64 will preferably be located around the end of the diaphragm 7 and the tube 4 between the diaphragm and the inner wall of the head 49.

The outlet tube 5 of the valve assembly 1 can be similarly secured adjacent the outlet 51 from the body with a circular rib 65 around the outlet end of the diaphragm 7 engaged in a suitable recess in the body 49.

With this assembly it will be apparent that the chamber 10 of valve assembly 1 is formed between the body 49 of the cleaner and the diaphragm 7. This valve assembly 1 has the chamber 10 sealed as is described with reference to FIG. 2 above.

It will of course be appreciated that the diaphragm 7 can be located in the body in any convenient manner and also that the particular embodiment of valve assembly 1 incorporated into the cleaner 48 can be chosen and designed to meet any particular application. For example, the embodiment described and illustrated in FIG. 6 with regard to the connection tube 36 extending between the chamber 10 and the outlet from the body 49 is indicated in dotted lines in FIG. 10.

The material from which the diaphragm 7 is to be made must be chosen to meet the particular application of the valve assembly 1. In the case of a pool cleaner the material must be capable of flexing very many times in an environment of chlorinated water without deterioration over a considerable period of time. In this application it is anticipated that polyurethane or a polyurethane mix will be suitable. Other materials are also expected to be developed for this application.

As has been set out above the diaphragm 7 may take many forms and it is anticipated that the material thereof may in appropriate circumstances be reinforced. This reinforcement can be provided by suitable fabric or other woven or non-woven strands of material.

Also it will be understood that cleaner 49 will be fitted with the well known balancing and ballast arrangement to maintain at stable and in proper relation to the surface which it is to clean. This is indicated by an outer body 66 around the cleaner head 49 with weights 67 and 68 located therein. The weight 67 is free to move in a housing 69 of vee-shape to assist in turning th cleaner away from the surface of the pool in which it is to operate.

A float 70 is included to ensure that the cleaner will settle in the pool on the disc with the head 46 upwards.

In use the cleaner is connected to the filter pump in the manner set forth above. Operation of the filter pump will cause water and dirt to be drawn through the valve assembly 1 in head 49 and this will cause the diaphragm 7 to repeatedly and alternately contract and expand as decribed above. This movement of the diaphragm 7 will result in interruptions in flow of water to the pump and thus generate intermittent propulsive forces in the cleaner which cause the cleaner to move in stepwise random fashion over the floor and walls of the pool to be cleaned as disclosed in U.S. Pat. No. 4,208,752.

The diaphragm being tubular and of substantial diameter makes it possible for the cleaner to collect debris of considerable size and length from the surface to be cleaned and pass this debris through the valve assembly to the filtration plant.

In accordance with the description given of the device of FIG. 6, it will be appreciated that an outlet from the chamber to ambient is not required. Similarly, the device of FIG. 1 does not necessarily reuire the inlet 9 to the chamber. In this regard, too, it will be noted that the pool cleaner shown in FIG. 10 contemplates a valve assembly without a vent opening from the chamber to ambient or the valve 39 (FIG. 6) and the provision of a communication passageway from the chamber to the region of reduced pressure or suction applied to the device as a whole.

Figures 11, 12, 13:
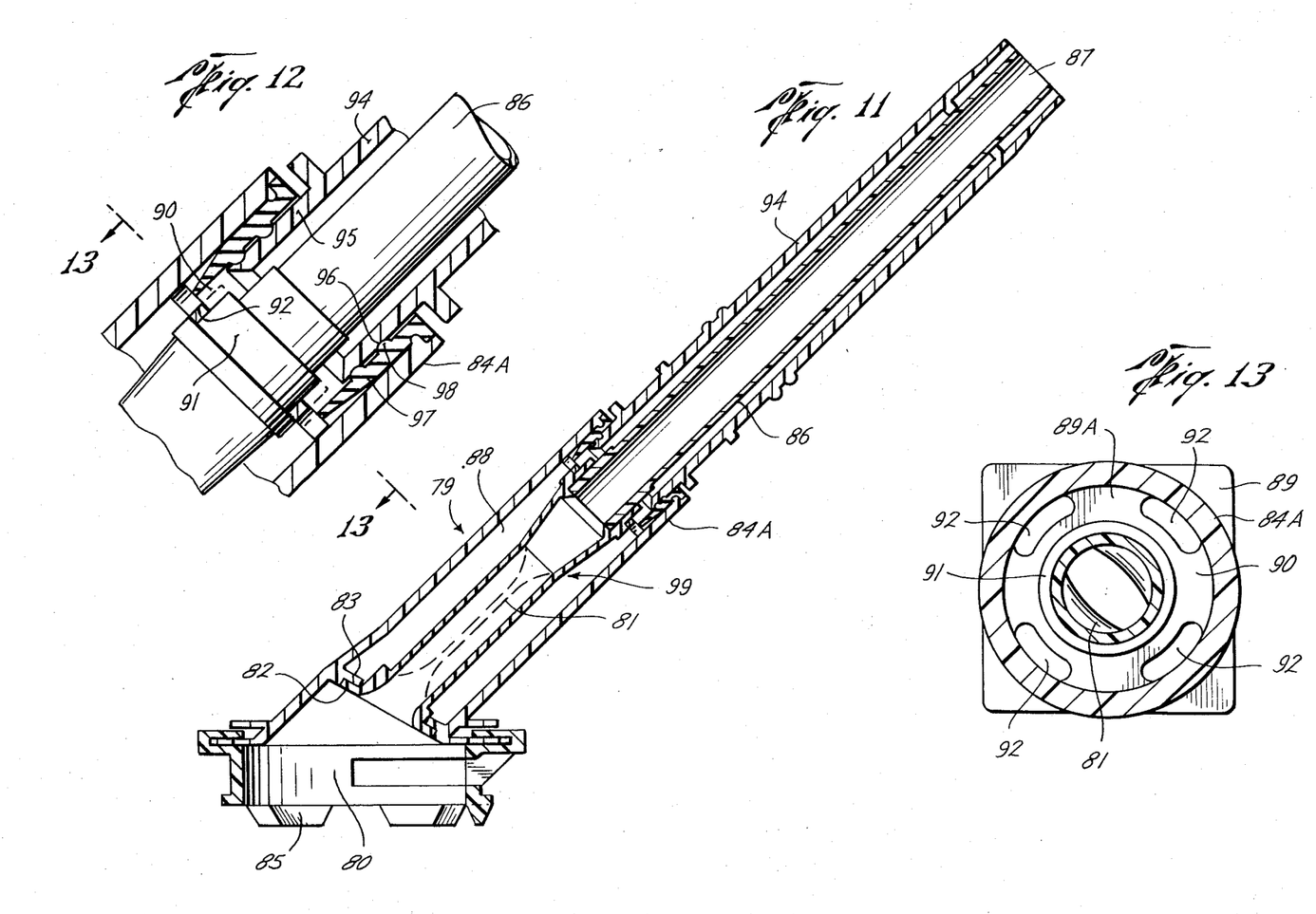
FIGS. 11-13 illustrate an alternative embodiment of the automatic valve and pool cleaner.

FIG. 11 illustrates an axial section view of a valve assembly in an automatic pool cleaner in which the chamber of the valve assembly has a fluid path externally of the tubular member to the fluid outlet.

FIG. 12 is an enlarged view of a portion of the valve assembly of FIG. 11.

FIG. 13 is a section taken along the lines 13—13 of FIG. 11.

Referring to FIGS. 11 and 12, the automatic pool cleaner shows an operating head 79 and a foot 85 for the cleaner to contact the surface to be cleaned. The head 79 includes an inlet mouth 80 to a flexible tubular member or diaphragm 81. The lower or inlet end of diaphragm 81 is enlarged to define a flange 82 which engages and seals against a flange 83 on the body 84. The upper or outlet end of tubular diaphragm 81 terminates in an elongated rigid tubular section 86 and outlet 87. The flexible portion of tubular member 81 is housed within body 84 to define a chamber 88. The upper or downstream end of chamber 88 is defined by a plate 89. Plate 89 as shown in FIG. 13 is substantially square as is the cross section of body 84 below or upstream of plate 89. Above or downstream of plate 89, body 84 is tubular in shape as shown at 84a of FIG. 13 to define an annular space 90 between body 84 and an enlarged section 91 of the rigid portion 86 of tubular member 81. A portion of enlarged section 91 is physically joined around its periphery to the plate 89 at an internal portion 89a. A plurality of ports 92 around in plate 89a provide for fluid communication between the interior of chamber 88 and the annulus 90.

As shown in FIG. 13, the flexible portion or diapgragm 81 in the tubular passageway is preferably formed to be partially closed or restricted in a relaxed condition in comparison with the rigid portion 86.

A substantially rigid conduit 94 fits loosely around rigid portion 86 of the tubular passageway 99 above the diaphragm 81 upstream or lower end 95 of conduit 94 defines the lower portion of annular space 90 permitting suction communication from space 90 through slots 92 to chamber 88. End 95 has one ore more peripheral grooves 96 on its outer surface.

A bushing 97 fits loosely between the round upper end portion of body 84 and conduit 94. Bushing 97 has one or more peripheral ridges 98 which snap or otherwise fit loosely within the grooves 96 to lock conduit 94 to the bushing. The conduit 94 is joined to body 84 by simply forcing bushing 97 into the downstream or upper end of the body.

In operation the valve assembly of FIGS. 11-13 is similar in principle to the valve assembly of FIG. 6 in that the chamber 88 has a suction connection to the outlet 87. No inlet valve is provided in the device of FIGS. 11-13, the chamber being satisfactorily filled with water upon immersion of the device through the loose connection at conduit 94 and bushing 97 and through annular space 90. An inlet may be provided if desired, however.

It should be clearly understood that it is not essential for the diaphragm or contracting member to completely cut off flow. It is satisfactory if there is produced an interruption of the water stream through the tubular passageway of a magnitude sufficient to induce movement in the device.

What we claim as new and desire to secure by Letters Patent is:

1. A valve assembly comprising:
   a body having a fluid inlet and a fluid outlet;

a flow passage between the inlet and the outlet at least partly defined by a tubular member which is transversely contractible and expansible over at least part of its length to control the flow of fluid through the passage, the body forming a chamber around the tube and being made of elastic material less elastic than the contractible and expansible part of the tubular member; and means, responsive to variation in pressure internally and externally of the tubular member, for controlling the flow of fluid through the flow passage.

2. A valve assembly as claimed in claim 1 in which the part of the tubular member which is contractable and expansible is circumferentially contractable and expansible.

3. A valve assembly as claimed in claim 1 in which the tubular part is made from elastomeric material.

4. A valve assembly as claimed in claim 1 in which the tubular member includes a flexible insert capable of contracting or expanding the flow passage through the body.

5. A valve assembly as claimed in claim 1 in which the tubular member includes parts of different flexibility.

6. A valve assembly as claimed in claim 1 in which the body forms a sealed chamber of compressible fluid around at least the contractable and expansible part of the tubular member to provide the means responsive to pressure internally and externally of the tubular member.

7. A valve assembly comprising:
a body having a fluid inlet and a fluid outlet;
a flow passage between the inlet and the outlet at least partly defined by a tubular member which is transversely contractibel and expansible over at least a portion of its length to control the flow of fluid through the passage;
the body forming a chamber around the tube and including a flexible panel of material biased to be less flexible than the contractibel and expansible part of the tubular member; and
means, responsive to variation in pressure internally and externally of the tubular member, for controlling the flow of fluid through the flow passage.

8. A swimming pool cleaner of the type wherein an interruption of the flow of water through the cleaner is utilized to prodive a propulsive force to cause the cleaner to move automatically across the surface to be cleaned characterized in that the flow path through the cleaner includes a valve assembly comprising:
a body having a fluid inlet and a fluid outlet;
a flow passage between the inlet and the outlet at least partly defined by a tubular member which is transversely contractible and expansible over at least part of its length to control the flow of fluid through the passage, the body forming a chamber around the tube; and
means, responsive to variation in pressure internally and externally of the tubular member, for controlling the flow of fluid through the flow passage, the means controlling the flow of fluid comprising a fluid path from the chamber externally of the tubular member into the fluid outlet downstream of the contractible and expansible part of the tubular member.

9. A swimming pool cleaner as claimed in claim 8 in which the part of the tubular member which is contractable and expansible is circumferentially contractable and expansible.

10. A swimming pool cleaner as claimed in claim 8 in which the tubular part is made of elastomeric material.

11. A swimming pool cleaner as claimed in claim 8 in which the tubular member includes a flexible insert capable of contracting or expanding the flow passage through the body.

12. A swimming pool cleaner as claimed in claim 8 in which the tubular member includes parts of different flexibility.

13. A swimming pool cleaner as claimed in claim 8 in which the body forms a sealed chamber of compressible fluid around at least the contractable and expansible part of the tubular member to provide the means responsive to pressure internally and externally of the tubular member.

14. A swimming pool cleaner as claimed in claim 8 in which the fluid path includes a secondary control valve.

15. A swimming pool cleaner as claimed in claim 8 in which the fluid path includes an inlet into the chamber from outside the body.

16. A swimming pool cleaner as claimed in claim 15 in which the inlet through the outer chamber wall is controlled by a secondary valve.

17. A device for cleaning the submerged surface of a swimming pool, said device comprising:
a head having an open mouth to fit against the surface to be cleaned, said head having an outlet for connection with a flexible hose to permit suction to be applied to the head from the hose to suck water through the head; and
an automatic valve between said mouth and said outlet comprising a contractible tubular member adapted to contract sufficiently to create an interruption in water flow to said outlet, said interruption of flow being sufficient to produce a movement of said device along said submerged surface; said tubular member being a flexible tubular member enclosed in a chamber adapted to contain water and including a connection passage between said chamber and the suction source applied to said outlet.

18. The device of claim 17 wherein said tubular member is a flexible member enclosed in a closed chamber, and wherein said chamber is filled with a compressible fluid.

19. The device of claim 17 wherein said chamber is provided with an opening to the water of the pool surrounding said device when in use to permit said chamber to be filled with water.

20. The device of claim 19 wherein said opening in said chamber is provided with a valve which will close when water is sucked from said chamber through said connection passage at a sufficient rate.

21. A device for cleaing the submerged surface of a swimming pool, said device comprising:
a head having an open mouth to be disposed proximate the surface to be celaned and having an outlet for connection with a flexible hose to permit liquid to be sucked through the head by suction applied to the outlet; and
an automatic valve between said mouth and said outlet including a contractible tubular member adapted to contract sufficiently to create an interruption in water flow to said outlet, said interruption of flow being sufficient to produce a movement of said device along said submerged surface, a chamber enclosing the tubular member and adapted to contain water at ambient pressure, and a passage for establishing pressure communication of the chamber with the outlet to provide for a reduction in pressure in the chamber below ambient upon interruption of liquid flow.

22. A device for cleaning the submerged surface of a swimming pool, comprising:

a head having an open mouth to be disposed proximate the surface to be cleaned, having an outlet to be coupled with a flexible hose, and having a passage defined between the mouth and the outlet to permit liquid to be drawn therethrough by suction applied to the outlet;

the wall of said passage being defined at least in part by a flexible member for autonomous deflectable movement to sufficiently restrict said passage upon the application of suction to the outlet to create an interruption of liquid flow adequate to impart motive force to the head and move the head along the submerged surface;

said flexible member being enclosed by a chamber adapted to contain water at ambient pressure, said chamber being in pressure communication with the suction applied to the outlet to cause a reduction in pressure in the chamber below ambient upon interruption of liquid flow.

23. The device of claim 22 wherein said chamber is provided with an opening to admit water of the pool surrounding said device when in use to permit said chamber to be filled with water.

24. The device of claim 22 wherein said chamber is provided with an opening to admit water surrounding said device when placed in a pool for use, said opening being adapted to close when pressure is reduced within said chamber.

25. A device for cleaning the submerged surface of a swimming pool, said device comprising:

a head having an open mouth to be disposed proximate the surface to be cleaned and having an outlet for connection with a flexible hose to permit liquid to be sucked through the head by suction applied to the outlet;

an automatic valve between said mouth and said outlet comprising a contractible tubular member adapted to contract sufficiently to create an interruption in water flow to said outlet, said interruption of flow being sufficient to produce a movement of said device along said submerged surface, the head including a body defining a chamber enclosing the tubular member and adapted to contain water at ambient pressure;

the outlet of the head including first and second conduits of differing diameter concentrically disposed relative to one another to form an annulus, the first, inner conduit being in communication with the tubular member of the automatic valve and the second, outer conduit being attached to the body of the head; and a plate carried by the body of the head to define the downstream end of the chamber, said plate having a port opening therein to place the interior of the chamber in pressure communication with the annulus between the concentric pipes to provide for a reduction in pressure in the chamber upon interruption of liquid flow.

26. The device of claim 25 wherein the plate has a plurality of port openings between the chamber interior and annulus of the conduits.

27. The device of claim 25 wherein the outer conduit is attached by a bushing carried thereon and adapted to be inserted into a receptacle formed on the body of the head.

28. The device of claim 25 wherein the bushing includes a fitting providing for rotation of the outer conduit about its longitudinal axis

* * * * *